United States Patent
Lan et al.

(10) Patent No.: US 8,497,945 B2
(45) Date of Patent: Jul. 30, 2013

(54) RADIO FREQUENCY FRONT END CIRCUIT MODULE FOR RECEIVER

(75) Inventors: Wen-chun Lan, Hsinchu (TW); Sheng-you Wen, Hsinchu (TW); Min-wei Albert Wang, Fremont, CA (US)

(73) Assignee: Taiwan Microelectronics Technologies Inc., Hsinchu (TW)

( * ) Notice: Subject to any disclaimer, the term of this patent is extended or adjusted under 35 U.S.C. 154(b) by 3 days.

(21) Appl. No.: 13/275,283

(22) Filed: Oct. 17, 2011

(65) Prior Publication Data
US 2012/0188464 A1    Jul. 26, 2012

(30) Foreign Application Priority Data

Jan. 21, 2011   (TW) .............................. 100201421 U

(51) Int. Cl.
*H04N 5/50* (2006.01)
(52) U.S. Cl.
USPC ........................................................ 348/731
(58) Field of Classification Search
USPC .. 348/731, 725, 726, 552, 553, 732; 455/126, 455/193.2, 127.3, 182.3, 190.1, 192.3
See application file for complete search history.

(56) References Cited

U.S. PATENT DOCUMENTS

| | | | |
|---|---|---|---|
| 6,377,315 B1* | 4/2002 | Carr et al. | 348/726 |
| 7,389,091 B2* | 6/2008 | Tanaka | 455/126 |
| 7,535,299 B2* | 5/2009 | Tanaka | 330/250 |
| 2005/0253663 A1* | 11/2005 | Gomez et al. | 333/100 |
| 2007/0132889 A1* | 6/2007 | Pan | 348/726 |
| 2008/0079650 A1* | 4/2008 | Constantinidis et al. | 343/858 |
| 2008/0204144 A1* | 8/2008 | Kasha et al. | 330/284 |
| 2011/0317077 A1* | 12/2011 | Coban et al. | 348/726 |
| 2012/0176550 A1* | 7/2012 | Hendrickson et al. | 348/726 |

* cited by examiner

*Primary Examiner* — Paulos M Natnael
(74) *Attorney, Agent, or Firm* — Cheng-Ju Chiang

(57) ABSTRACT

A radio frequency front end circuit module for a receiver used in a digital television is disclosed. The radio frequency front end circuit module includes a switch set, a differential low noise amplifier, a filter, and a tuner. The switch set receives two differential signals. The differential low noise amplifier is electrically coupled to the switch set for amplifying the two differential signals. The filter is electrically coupled to the differential low noise amplifier for filtering out portions which are excluded in a predetermined bandwidth of the two amplified differential signals. The tuner determines how to control the switch set to select the two differential signals in the predetermined bandwidth according to the filtered differential signals. The present invention is capable of amplifying the received differential signals and rejecting noise which has the same phase as that of the received differential signals.

6 Claims, 2 Drawing Sheets

RADIO FREQUENCY FRONT END CIRCUIT MODULE FOR RECEIVER

BACKGROUND OF THE INVENTION

1. Field of the Invention

The present invention generally relates to a radio frequency (RF) front end circuit, and more particularly to a radio frequency front end circuit module for a receiver in a digital television (DTV).

2. Description of Prior Art

As is known to all, an anti-noise performance of digital signals is better than that of analog signals. The digital signals which are received from a receiver are approximately similar to the digital signals which are transmitted by a transmitter without distortion. Accordingly, in television applications, the image quality of a digital television is better than that of an analog television.

A radio frequency front end circuit for a receiver in a digital video broadcasting-terrestrial (DVB-T) system receives high frequency analog signals which are non-differential from an antenna. After processing, the high frequency analog signals are converted into baseband analog signals or low frequency analog signals. Finally, the baseband analog signals or the low frequency analog signals are converted into digital signals for the following processes. In summary, the radio frequency front end circuit processes the analog signals. After the analog signals are processed, a baseband circuit processes the digital signals.

A conventional radio frequency front end circuit comprises functions of selecting a bandwidth of, amplifying, filtering, and tuning the analog signals. Each function is performed by a chip. Conductive wires are connected among the chips for transmitting the analog signals. However, when the analog signals are transmitted among the chips, the analog signals are easily affected by external noise. Accordingly, the analog signals are distorted and the image quality is bad.

Furthermore, electronic products are required to be lightweight now. However, the chips for performing the above-mentioned functions are implemented independently, and thus the size of the conventional radio frequency front end circuit is large and the conventional radio frequency front end circuit fails to be integrated to achieve the lightweight goal. Moreover, because the above-mentioned chips are implemented independently, the conductive wires are so long that the analog signals are easily affected by the external noise and the risk of distortion is increased.

Thus, there is a need for a solution to solve the above-mentioned problems that the conventional radio frequency front end circuit is easily affected by the external noise and the lightweight goal cannot be achieved.

SUMMARY OF THE INVENTION

An objective of the present invention is to provide a radio frequency front end circuit module for a receiver which is capable of amplifying signals and rejecting noise.

According to an aspect of the present invention, the radio frequency front end circuit module for the receiver is used in a digital television. The radio frequency front end circuit module comprises a switch set, a differential low noise amplifier, a filter, and a tuner. The switch set receives two differential signals which complement each other. The differential low noise amplifier is electrically coupled to the switch set for amplifying the two differential signals. The filter is electrically coupled to the differential low noise amplifier for filtering out portions which are excluded in a predetermined bandwidth of the two amplified differential signals. The tuner determines how to control the switch set to select the two differential signals in the predetermined bandwidth according to the two filtered differential signals which are outputted by the filter.

In the radio frequency front end circuit module in accordance with the present invention, the differential low noise amplifier amplifies the differential signals and rejects the noise which has the same phase as that of the differential signals. Compared with the conventional radio frequency front end circuit which receives one non-differential signal, the radio frequency front end circuit module in accordance with the present invention has a better anti-noise performance.

DETAILED DESCRIPTION OF THE INVENTION

Figure 1:
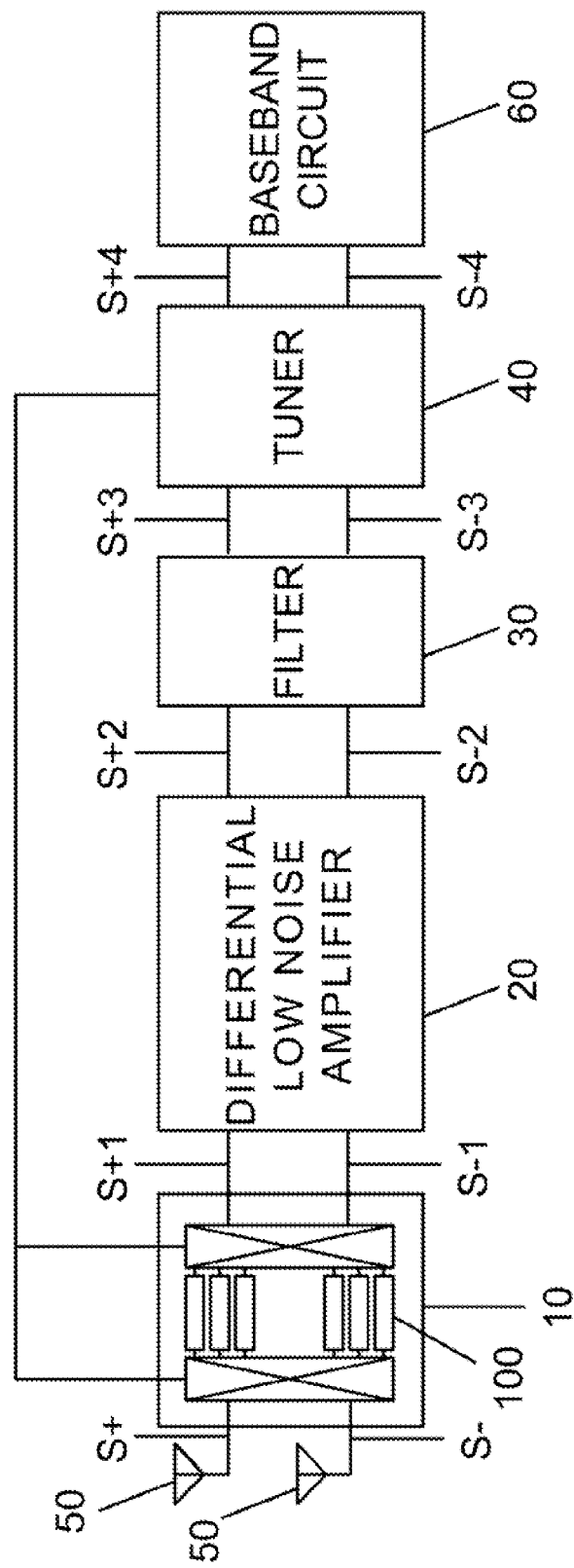
FIG. 1 shows a radio frequency front end circuit module in accordance with a first embodiment of the present invention.

Please refer to FIG. 1, which shows a radio frequency front end circuit module in accordance with a first embodiment of the present invention. The radio frequency front end circuit module is applied to a digital television. The radio frequency front end circuit module comprises a switch set 10, a differential low noise amplifier (LNA) 20, a filter 30, and a tuner 40.

The switch set 10 receives two differential signals S+ and S− from at least one antenna. In the present embodiment, the switch set 10 receives the differential signals S+ and S− from two antennas 50. The two differential signals S+ and S− complement each other. That is, amplitudes of the two differential signals S+ and S− are the same and phases of the two differential signals S+ and S− are opposite. In general, a bandwidth in a digital video broadcasting-terrestrial standard is approximately ranged from 147 mega hertz (MHz) to 860 mega hertz. The bandwidth range is broad, and thus the switch set 10 is required to comprise a plurality of matching arrays 100. Each of the matching arrays 100 corresponds to a different bandwidth and outputs the first pair of differential signals S+1 and S−1 to the differential low noise amplifier 20.

The differential low noise amplifier 20 is electrically coupled to the switch set 10 for amplifying the first pair of differential signals S+1 and S−1 which have opposite phases and rejecting noise which has the same phase (i.e. common mode noise) as that of the first pair of differential signals S+1 and S−1. Then, the differential low noise amplifier 20 outputs a second pair of differential signals S+2 and S−2 to the filter 30. Accordingly, the effects of high gain and low noise can be achieved, so that the second pair of differential signals S+2 and S−2 are not distorted and have the best performance.

It is noted that the differential low noise amplifier 20 rejects the noise in the bandwidth in the digital video broadcasting-terrestrial standard (i.e. 147 MHz to 860 MHz). The filter 30 is electrically coupled to the differential low noise amplifier 20 for receiving the amplified second pair of differential signals S+2 and S−2 and filtering out portions which are excluded in the digital video broadcasting-terrestrial standard. That is, the portions in the bandwidth from 147 MHz to 860 MHz of the second pair of differential signals S+2 and S−2 remain, and the portions in the bandwidth of less than 147 MHz and greater than 860 MHz of the second pair of differential signals S+2 and S−2 are filtered out. Then, a third pair of differential signals S+3 and −3 which are filtered by the filter 30 are outputted to the tuner 40.

The tuner 40 is electrically coupled to the filter 30 for generating a or a set of feedback signals to control the switch set 10 according to the third pair of differential signals S+3 and −3. For instance, the tuner 40 determines whether the differential signals S+ and S− are in a correct or predetermined bandwidth by checking the power of the third pair of differential signals S+3 and −3, that is, whether the differential signals S+ and S− are in the bandwidth of the digital video broadcasting-terrestrial standard. When the power is not correct, such as too low, the tuner 40 generates the feedback signal to select another matching array 100 having another bandwidth. In contrast, when the tuner 40 determines that the differential signals S+ and S− are in a correct or predetermined bandwidth according to the power of the third pair of differential signals S+3 and −3, the tuner 40 outputs a fourth pair of differential signals S+4 and S−4. Then, the fourth pair of differential signals S+4 and S−4 are converted into middle frequency signals or low frequency signals and transmitted to a baseband circuit 60 in the digital television. It is noted that the baseband circuit 60 is a conventional device for reducing the frequencies of the fourth pair of differential signals S+4 and S−4 and converting the fourth pair of differential signals S+4 and S−4 into digital signals. The conventional baseband circuit 60 and the following steps of processing the digital signals are known for one skilled in the same art of the present invention and thus not described in detail herein.

In the radio frequency front end circuit module in accordance with the present invention, the differential low noise amplifier 20 amplifies the received differential signals S+ and S− and rejects the noise (i.e. common mode noise) which has the same phase as that of the received differential signals S+ and S− when the received differential signals S+ and S− are transmitted. Compared with the conventional radio frequency front end circuit which receives one non-differential signal, the radio frequency front end circuit module in accordance with the present invention has a better anti-noise performance.

Figure 2:
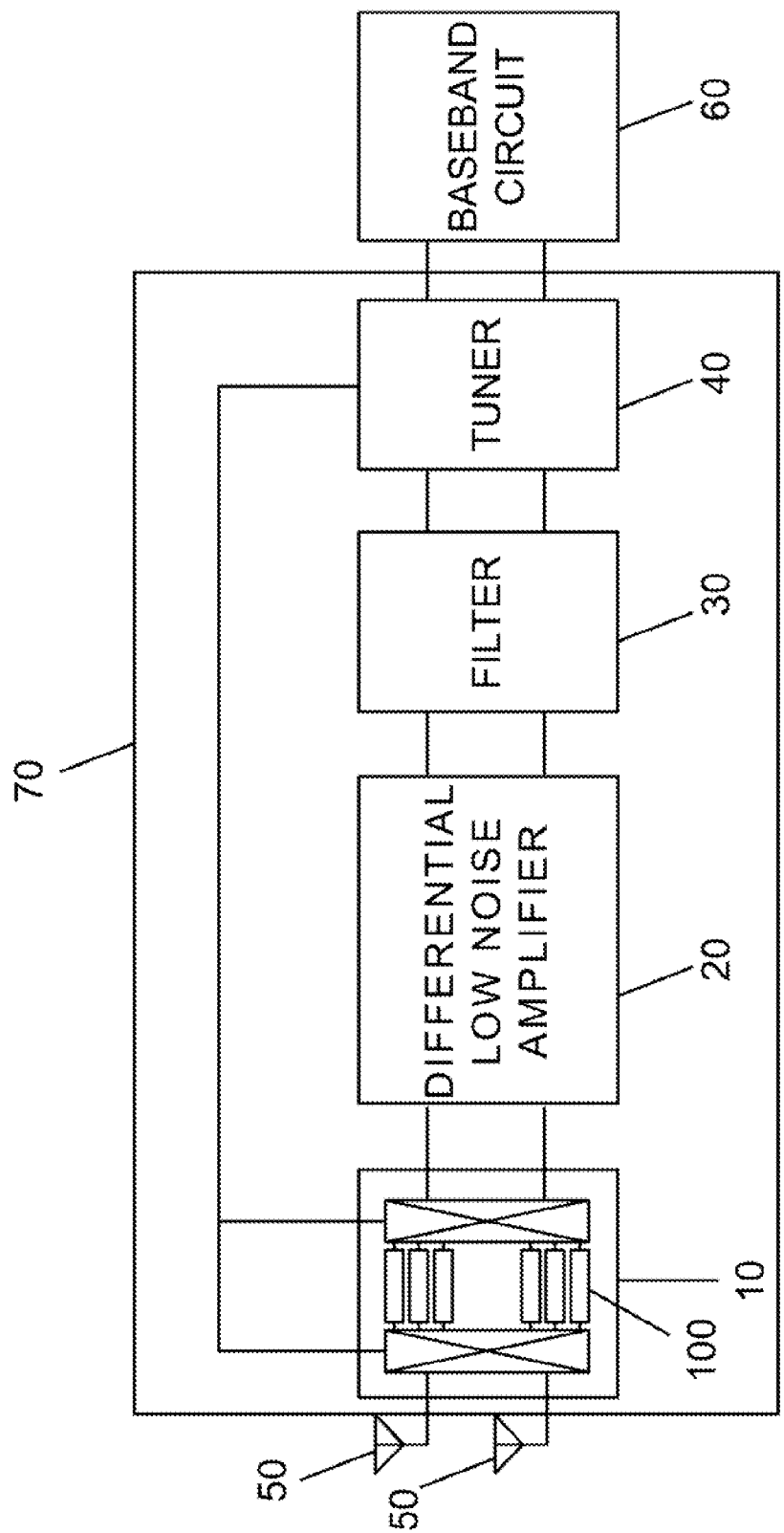
FIG. 2 shows a radio frequency front end circuit module in accordance with a second embodiment of the present invention.

Please refer to FIG. 2, which shows a radio frequency front end circuit module 70 in accordance with a second embodiment of the present invention. In the present embodiment, the switch set 10, the differential low noise amplifier 20, the filter 30, and the tuner 40 are further integrated as a system in package (SIP). That is, the switch set 10, the differential low noise amplifier 20, the filter 30, and the tuner 40 are manufactured on a package substrate and packaged as a single chip. As a result, the area of the radio frequency front end circuit module 70 can be decreased and the system integrity can be increased, so as to achieve the lightweight goal.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A radio frequency front end circuit module for a receiver used in a digital television, the radio frequency front end circuit module comprising:
   a switch set, receiving two differential signals which complement each other;
   a differential low noise amplifier, electrically coupled to the switch set for amplifying the two differential signals;
   a filter, electrically coupled to the differential low noise amplifier for filtering out portions which are excluded in a predetermined bandwidth of the two amplified differential signals; and
   a tuner, determining how to control the switch set to select the two differential signals in the predetermined bandwidth according to the two filtered differential signals which are outputted by the filter;
   wherein the switch set comprises a plurality of matching arrays.

2. The radio frequency front end circuit module as claimed in claim 1, wherein the two differential signals are received by at least one antenna.

3. The radio frequency front end circuit module as claimed in claim 1, wherein the predetermined bandwidth is ranged in a digital video broadcasting-terrestrial standard.

4. The radio frequency front end circuit module as claimed in claim 1, wherein the tuner determines how to control the switch set to select the two differential signals in the predetermined bandwidth by checking the power of the two filtered differential signals.

5. The radio frequency front end circuit module as claimed in claim 1, wherein the switch set, the differential low noise amplifier, the filter, and the tuner are packaged on a single package substrate.

6. A radio frequency front end circuit module for a receiver used in a digital television, the radio frequency front end circuit module comprising:
   a switch set, receiving two differential signals which complement each other;
   a differential low noise amplifier, electrically coupled to the switch set for amplifying the two differential signals;
   a filter, electrically coupled to the differential low noise amplifier for filtering out portions which are excluded in a predetermined bandwidth of the two amplified differential signals; and
   a tuner, determining how to control the switch set to select the two differential signals in the predetermined bandwidth according to the two filtered differential signals which are outputted by the filter;
   wherein the tuner determines how to control the switch set to select the two differential signals in the predetermined bandwidth by checking the power of the two filtered differential signals.

* * * * *